INVENTORS
RAY EDWARDS &
GERALD E. BUTLER

ATTORNEY

INVENTORS
RAY EDWARDS &
GERALD E. BUTLER 3,418,396
POLYPROPYLENE-POLYETHYLENE COMPOSITIONS FOR EXTRUSION COATING
Ray Edwards and Gerald E. Butler, Longview, Tex., assignors to Eastman Kodak Company, Rochester, N.Y., a corporation of New Jersey
Filed Jan. 6, 1966, Ser. No. 519,142
12 Claims. (Cl. 260—897)

ABSTRACT OF THE DISCLOSURE

A polyolefin composition for extrusion, coating and molding various articles, comprising a predominant portion of a mixture of from about 40% to 99% by weight of a polypropylene having a flow rate of from about 12 dg./min. to 120 dg./min. and about 1% to 60% of a polyethylene having a melt index of from about 1 dg./min. to 15 dg./min., a density greater than about 0.912 g./cc., and a melt index recovery of greater than 50%.

---

Figure 1:
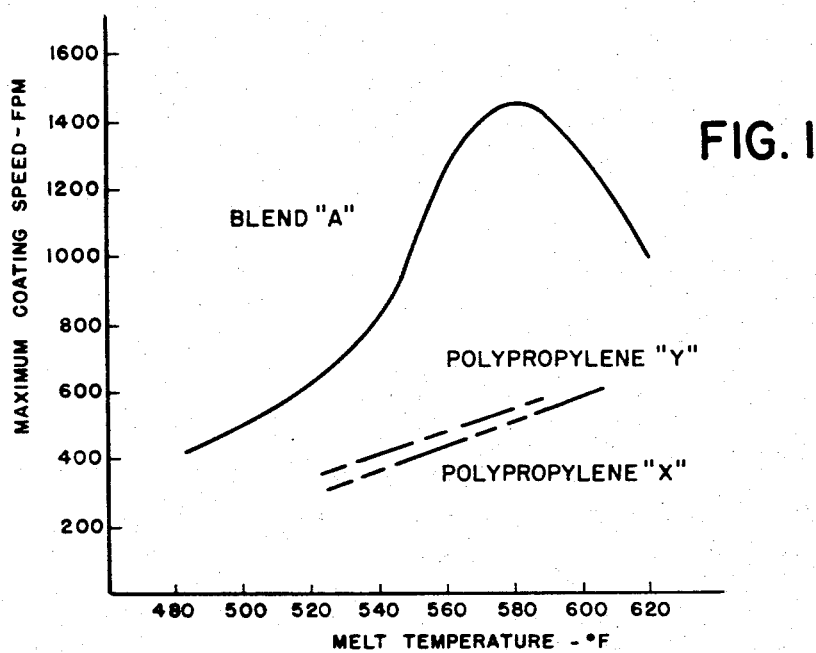

This invention relates to blends of crystalline, high flow rate polypropylene with polyethylene having a high melt index recovery, which provides a polymer having improved physical and fabrication properties, and the utilization of the polymer.

A wide variety of polyethylenes and polypropylenes, both crystalline and amorphous, and of high or low densities, are commercially available. Problems have been encountered in fabricating articles from given polymers, and much research, past and present, has been conducted in the industry for solutions to these problems. For example, in fabricating articles from these polyolefins, characteristics inherent in the materials have limited the profitable exploitation thereof by narrowing the fields of use or by making large investments in labor and capital necessary in order to achieve a large output of products having good quality.

An instance of a highly developed process, in which problems continue to be encountered, is in the formation of thin films or other articles of the polymers by fusing the same, forcing the melt through an orifice, and solidifying the so-formed article. A particular area involving extrusion of films is in the continuous coating of paper or paperboard webs by directing the extruded film or web through an air gap while in a soft, tacky, adherable state, into contact with the moving cellulosic sheet, and applying pressure to the two layers. When this process is practiced with polyethylene or polypropylene, a number of problems are encountered. One of these is the tendency of the plastic web to "neck in" or reduce in width between the point of extrusion and the point of contact with the cellulosic or other substrate. This results in wasteful edge beads of plastic which must be trimmed from the product. Thus, when a high flow rate, crystalline polypropylene is extruded in this way, the speed of extrusion is severely limited in that at high linear speeds of the paper, a prohibitive degree of neck in, weaving (nonuniform width), surging (uneven flow resulting in a rough or streaked surface), and even tearing of the freshly extruded plastic web often result.

The stress crack life of products from these polymers often leaves much to be desired, as does the amount of curl of formed sheets, particularly of high density polyethylene.

The fabrication properties of a highly crystalline, high flow rate polypropylene, which has been found to be commercially acceptable when extrusion coated on paper, illustrated the limitations encountered. Thus, the minimum coating weight is 8 lb./ream of paper (about 0.6 mil coating thickness) at maximum coating speeds of only about 300 feet per minute (f.p.m.). At higher coating speeds, neck in, weaving, surging, tearing and other problems are encountered. Where thin coatings are applied, pinholes cause a product unacceptable for some uses, such as paper or paperboard containers for liquids or moisture-sensitive materials.

An object of the present invention is to provide a composition of a blend of specific types of polyethylene and polypropylene, each having critical properties, whereby the blend has improved physical and fabrication properties, and which overcomes defects and problems such as those discussed above, and others.

Another object of the invention is to provide a blend of crystalline polypropylene having a high flow rate with polyethylene having a high melt index recovery, of improved physical and fabrication properties, and utilization thereof.

A further object of the invention is to provide such a blend and the utilization thereof in high speed extrusion coating of cellulosic sheets while largely eliminating problems such as neck in, weaving, surging, and tearing of the extruded web. These and other objects of the invention will be apparent in the following description and claims.

The drawings, FIGS. 1–4, show properties of the products of the invention, particularly in comparison with other materials. The drawings are discussed further in connection with the examples.

While mention has been made of the formation of thin films and extrusion coatings of the polymers useful in this invention, the blends are useful anywhere that polypropylene may be used. Examples are in the fabrication or manufacture of injection molded articles, extruded pipe, blow molded articles, very thin coatings for meat wrapping paper, coatings on the inner wall of moisture resistant multiwall paper bags, and high gloss coatings on paper.

The polypropylene discovered to be useful in the invention must have a high flow rate (as defined hereinbelow) of between about 12 dg./min. and 120 dg./min., the preferred minimum being about 25 dg./min., and still more preferably at or above about 45 dg./min.

It must be a crystalline polymer, preferably at least about 88% hexane insoluble, and thus having a low (e.g., 4% to 12%) hexane extractibility. Details for its manufacture are well known to the art. Suitable polypropylenes are described in the following tables. The first table also includes blend "A," of the present invention, its preparation being described in Example 1.

REPRESENTATIVE PROPERTIES, POLYPROPYLENE COMPONENT AND BLEND "A" (EXAMPLE 1)

| Material | Polypropylenes | | | | Blend A |
|---|---|---|---|---|---|
| | X | Y | Z | W | |
| Flow Rate, dg./min. (230° C.) | 86 | 54 | 33 | 17 | 66 |
| Density, g./cc. | 0.917 | 0.916 | 0.911 | 0.912 | 0.917 |
| Brittleness Temperature, ° C | +23 | +20 | +19 | +12 | +23 |
| Inherent Viscosity | 0.89 | 0.98 | 1.13 | 1.21 | 0.93 |
| Tensile, lb./in.$^2$ (70° F.): | | | | | |
| At Fracture | 4,620 | 4,910 | | | 4,150 |
| At Yield | 4,620 | 4,910 | | | 4,150 |
| Percent Elongation | 0 | 0 | | | 0 |
| Stiffness in Flexure, lb./in.$^2$ | 145,000 | 174,100 | | | 122,000 |
| Vicat Softening Point, ° C | 143.7 | 147 | 142 | 141 | 139.8 |
| Rockwell Hardness (R Scale) | 96 | 101 | | | 92 |
| Tensile Impact, ft. lb./min | 9.8 | 8.0 | | | 11.5 |
| Izod Impact: | | | | | |
| Notched | 0.17 | 0.30 | | | 0.25 |
| Unnotched | 11.0 | 7.0 | | | 10.9 |

Of the more important physical properties of the polypropylene component, the benefits of the invention are attained by utilizing such component having characteristics within the following ranges:

Flow rate, dg./min. _____ [1] 12–120
Density, g./cc. _____ .89–.92
Inherent viscosity _____ .50–1.4
Vicat softening point, ° C. _____ 120–155

[1] Preferably 45–120.

The polyethylene component must have a high melt index recovery (at least 50%), has a density of above about .912 and has a relatively high melt index. It is prepared by methods well known to the art, and representative material are set forth in the following table.

REPRESENTATIVE PROPERTIES, POLYETHYLENE COMPONENT

| Polymer | Melt Index, dg./min. (190° C.) | Density, g./cc. | Melt Index Recovery, Percent |
|---|---|---|---|
| M | 3.5 | .917 | 70 |
| N | 8.2 | .975 | 45 |
| O | 7.2 | .971 | 61 |
| P | 1.7 | .918 | 70 |
| Q | 7.1 | .920 | 53 |
| Range | 1.0–15 | >.912 | >50 |

As may be seen, there is not necessarily an inherent correlation of the three properties. The melt index recovery is particularly critical and must be above about 50%.

The compositions may be prepared in various ways, such as dry blending, dry blending and then passing through a compounding extruder, compounding on a milling roll, or in a Banbury mixer, by fusion, or by blending in solution. Any method whereby the components can be blended together will produce the desired blend. For example, fine pellets of each polymer, having an average size of about 1/16 inch with up to about 20% of the pellets being about 1/8 inch in diameter with some pellets being smaller than 1/16 inch, are blended mechanically, and the blend is fed to an extruder wherein it is fused and extruded.

The melt may be extruded or fabricated at melt temperatures of up to about 600° F. although melt temperatures in the range of about 520° F. to 580° F. are preferred and have been found to give excellent results with maximum useable extruding or coating speeds with a minimum of defects such as pinholes.

Where the product is used for extrusion coating of a substrate such as paper or paperboard from the melt, it is apparent that such process has been used in examining the product, since the soft extruded polymer conforms to minute surface imperfections of the paper without penetrating deeply therein. If paper is the substrate, it may, for example, have a basis weight of from about 5 lbs. to about 200 lbs., which corresponds to paper as thin as tissue, and being up to the thickness of paperboard. Bleached or unbleached kraft as paper or thin board is preferred, although sheets from bleached or unbleached sulfite, groundwood, or soda pulps are useful. Similarly, other fibrous or nonfibrous substrates may be coated.

The polymers of the invention may be compounded with additives such as antioxidants, stabilizers for inhibiting degradation by heat, ultraviolet light and weathering, opaqueing pigments such as titanium dioxide and carbon black, plasticizers, and small amounts (less than about 20%) or other compatible polymers. For example, up to about 20% ethylene-propylene rubber does not detract from the injection molding properties of the blend of the invention. Similarly, for some uses, small proportions of other polyolefins, copolymers, and block copolymers thereof such as of ethylene and propylene may be blended with the polymer of the invention.

The blend of the invention contains 1–60% of the polyethylene, preferably 1–35%, and 40–99% of the polypropylene, preferably 65–99%.

The following examples are illustrative of the practice of the invention.

EXAMPLE 1

A polyethylene-polypropylene blend, hereafter called Blend "A," having a flow rate of 66 was made by blending 90% by weight of polypropylene "X" described above (86 flow rate) with 10% by weight of polyethylene "M" (flow rate of 3.5 dg./min., density of 0.917 g./cc., 70% MIR). These materials were evaluated as follows: each material was fed to a 3½-inch Egan extruder having a barrel length to diameter ratio of 24:1. The four zones of the extruder were maintained, from back to front, at 450° F., 540° F., 580° F., and 630° F. A metering type screw having six compression flights, and 12 metering flights were used. Prior to entering the die the melt passed through two screens, one 24 x 24 mesh and one 14 x 88 mesh. The die was an Egan die, center-fed with 1-inch long lands, with an opening of 24" x 0.020". The temperature of the die was held at 580° F. The extrusion rate was held constant at 215 pounds per hour. The resulting film extrudate was passed through a 4½-inch air gap into the nip formed by a rubber-covered pressure roll and a chill roll. At the same time, 40-pound basis weight kraft paper was fed into the nip with the pressure roll in contact with the kraft paper. The nip pressure applied was 110 pounds per linear inch. The chill roll was a 24-inch diameter mirror finish chrome-plated steel roll, water cooled to maintain a temperature of 60° F. on the roll. The coated paper was taken off the chill roll at a point 180° from the nip formed by the pressure roll and chill roll. The chill roll was operated at linear speeds of from 300 f.p.m. to 1450 f.p.m.

This coating procedure was repeated with the extruder barrel zones held, from back to front, at 500° F., 535° F., 540° F., and 550° F., and the die held at 550° F. A third coating procedure was repeated with the extruder barrel zones held, from back to front, at 500° F., 560° F., 595° F., and 670° F., and die held to 600° F.

A comparison of the extrusion coating properties of Blend "A" and the unmodified polypropylene are shown in the following table:

| Polymer | Blend "A" | Polypropylene | |
|---|---|---|---|
| | | "X" | "Y" |
| 1. Flow Rate (dg./min.) | 66 | 86 | 54 |
| 2. High Speed Coating Ability (f.p.m./lb./3,000 sq. ft.) | 1,450/4.6 | 500/14.7 | 600/14.4 |
| 3. Neck-In Per Edge, 400 f.p.m., 580° F. Die (Inches) | 2.75 | 3.3 | 4.07 |
| 4. Pinholes/ft.[2] in 1½ Mil Coatings, 580° F. Die | 0 | 25 | 100 |

EXAMPLE 2

In this example a number of materials are compared for extrusion coating properties based on the same evaluation procedures as described in Example No. 1. The percentage of polyethylene is based on weight and on the total amount of the two materials. These blends are compared to the unmodified polypropylene base materials and each other for extrusion coating properties in the following table:

TABLE I

| Blends or Materials | | Flow Rate of Polypropylene Component (dg./min.) | Melt Index Recovery of Polyethylene Component (Percent) | High Speed Coating Ability (f.p.m./lb./ 3,000 sq. ft.) | Melt Temp., ° F. | Neck-In Per Edge at 400 f.p.m. at 580° F. Melt (Inches) |
|---|---|---|---|---|---|---|
| Polypropylene | Polyethylene | | | | | |
| X | None | 86 | | 500/14.7 | 580 | 3.30 |
| X | +5% N | 86 | 45 | 400/18.5 | 580 | 3.35 |
| X | +5% Q | 86 | 53 | 600/11.7 | 580 | 3.10 |
| X | +5% O | 86 | 61 | 700/10.2 | 580 | 3.30 |
| X | +5% P | 86 | 70 | 1,150/6.25 | 580 | 3.03 |
| X | +5% M | 86 | 70 | 1,150/6.25 | 580 | 3.20 |
| X | +25% M | 86 | 70 | 1,350/4.35 | 620 | 1.25 |
| W | None | 17 | | 200/37 | 580 | |
| W | +5% M | 17 | 70 | 300/23.4 | 580 | |

Blend "A" offers an advantage in neck-in, high speed coating ability, and pinhole resistance. In other coating properties, e.g., adhesion, ability to take ink after electronic treatment, and grease proofness Blend "A" was at least as good as the unmodified polypropylene. "Neck-in" is defined as the difference in inches between the die length and the final film coating width. It is desirable to reduce this neck-in to a minimum to reduce edge bead and to provide as wide a uniform coating as possible. The "high speed coating ability" is determined by increasing the speed of the chill roll while maintaining a constant extrusion rate. The first indication of non-uniformity in the coating (e.g., streaks, edge weave, tearing) is taken as the maximum speed to which the resin can extrusion coat. Blend "A" showed signs of edge weave at a speed of 1450 f.p.m. whereas the unmodified polypropylene began to edge weave at 500 f.p.m. "Pinholes" are measured by applying a green dye in a detergent solution to the coated surface and determining the number of pinholes per square foot through which the dye has leaked into the substrate.

"Density" is determined by Plastics Laboratory Test Procedure No. 27–307, Issue 1, in conformance with ASTM Designation D1505–57T. Density specimens are first annealed to give maximum density by conditioning under a 25-inch Hg or higher vacuum for 1 hour at 150–155° C. followed by cooling under this vacuum at no greater than 20° C. per hour to a final temperature of less than 50° C. "Melt index" is determined by Plastics Laboratory Test Procedure No. 27–7, Issue 3, in conformance with ASTM Designation D1238–62T.

"Melt index recovery" (MIR), or plastic recovery, is determined by Plastics Laboratory Test Procedure No. 27–5, Issue 1. Melt index recovery is defined as the increase in the diameter of the extrudate over that of the orifice of the extrusion plastometer in ASTM Designation D1238–62T. The diameter of the specimen is measured in the area between 1/16 inch and 3/8 inch of the initial portion of the specimen as it emerges from the extrusion plastometer. Measurements are made by standard methods per ASTM Designation D–374. Melt index recovery is independent of the extent of chain branching in polyethylene. For example, polyethylenes having chain branching of 2.4, 1.75, 2.3, 1.75 and 2.8 methyl groups per 100 carbon atoms have, respectively, MIR's of 54, 52, 45, 32, and 28. "Flow rate" is determined by Plastics Laboratory Test Procedure No. 27–204 in conformance with ASTM Designation D1238.

In the above table it is also shown that the lower flow rate polypropylene (12 dg./min.) was not comparable to the high flow rate polypropylene (86 dg./min.) in high speed coating ability. The addition of high MIR polyethylene improved its high speed coating ability but not to the extent of the addition of high MIR polyethylene to high flow rate polypropylene. Also, it is shown that when 25% of polyethylene "M" is blended with polypropylene "X" the high speed coating ability is not impaired and the neck-in decreases significantly. This material, however, must run at a hotter melt temperature than a blend with a lower proportion of the high MIR polyethylene.

EXAMPLE 3

The equipment and procedure were the same as for Example 1, except for the use of shorter (⅛ in.) lands. A 24 L/D ratio screw with a compression ratio of 4 to 1 was used.

Blend "A" and polypropylenes "X" and "Y" were run at numerous extrusion conditions to determine optimum extrusion conditions and material limitations. Tests were run for maximum extrusion speed, neck-in, pinholes, and heat seal temperature.

To better illustrate the relationship between the three materials, the results will be presented for each extrusion coating property separately.

Drawdown

A major drawback of polypropylenes prior to this invention was their limited high speed coating ability and their inability to be extruded at very thin coatings. The processor was forced to run at speeds of below 500 f.p.m. and at coating weights of above 14 lb./ream. This severely limited the use of polypropylene coatings due to the economic considerations.

In Table II the maximum drawdown speed and minimum coating weights attainable for each of the materials evaluated are shown:

TABLE II

| Material | Maximum Drawdown Speed, f.p.m. | Minimum coating Weight, Lb./Ream |
|---|---|---|
| Blend "A" | 1,450 | 4.5 |
| Polypropylene "X" | 500 | 15.2 |
| Polypropylene "Y" | 550 | 14.4 |

In Table II it is shown that Blend "A" is superior to the other polypropylenes in drawdown ability and in minimum coating weight.

Experience has shown that drawdown is a function of temperature. In FIGURE 1 the relationship of drawdown to temperature is shown.

In FIGURE 1 we see that the optimum melt temperature for drawdown is in the vicinity of 580° F., or below, but as shown elsewhere, pinholes are reduced by a slightly lower melt temperature. A melt temperature of between about 520° F. and 580° F. has been found to give excellent results in the present invention. At a melt temperature of 560° F. on commercial size apparatus, the maximum coating speed for Blend "A" is over 2000 feet per minute, but this is not shown in FIG. 1 because of the difference in apparatus.

The polypropylenes began to show edge weave at 500 and 550 f.p.m., respectively, and there was some evidence of surging at these speeds. Under no conditions could these materials be drawn down to a coating weight of less than 14 lb./ream. Blend "A" on the other hand, has been used to coat 40 lb. basis weight paper uniformly to 4 to 6 lb./ream, at speeds in excess of 2000 f.p.m. without edge weave or surging.

Neck-in thermal stability

Neck-in was measured for each material at melt temperatures of 535° F. and 580° F. The following table shows the change in neck-in associated with this melt temperature change. This was measured at a coating speed of 275 f.p.m.

Material: Neck-in change, in./45° F.
- Blend "A" _____ 0.08
- Polypropylene "X" _____ 0.11
- Polypropylene "Y" _____ 0.20

Here we see that Blend "A" has good neck-in thermal stability used according to the invention. The polypropylenes could not be run faster than 275 f.p.m. at 535° F. melt. When Blend "A" is run at 700 f.p.m. its neck-in thermal change is only 0.05 in. per 45° melt temperature change.

Neck-in

Figure 2:
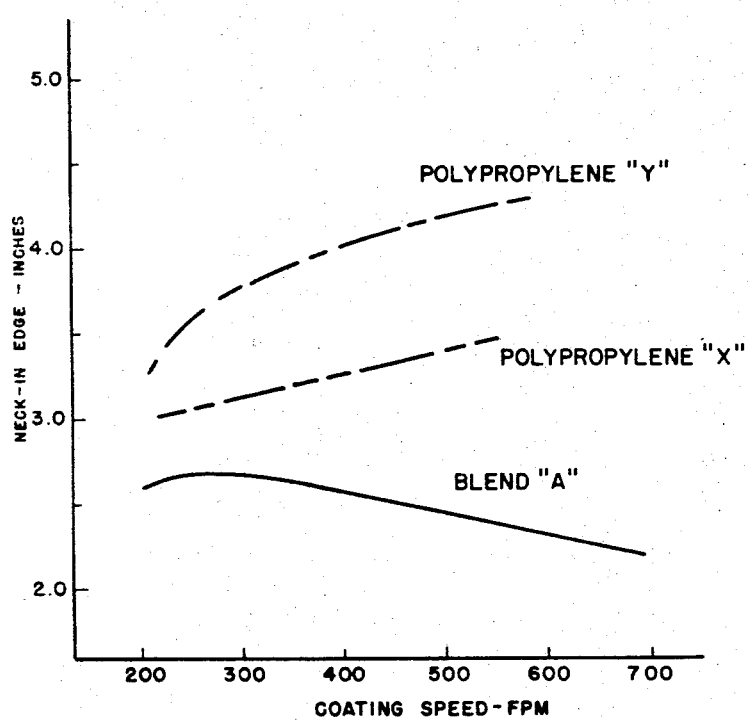

Neck-in is important to the extrusion coater for one major reason. This reason is that as neck-in increases the thickness of the edge bead also increases. This edge bead must be trimmed off and discarded making it desirable to have as thin an edge bead as possible. FIGURE 2 shows the neck-in obtained as a function of coating speed.

FIGURE 2 shows that for Blend "A" as coating speed increases the neck-in decreases, but for the polypropylenes the neck-in increases with increasing speed. Also from FIGURE 2 it is obvious that Blend "A" gives much less neck-in and thus far less waste material.

Pinholes

Results of a study of the effect of coating weight and melt temperature on pinholes in polypropylene coatings show that:

(1) Blend "A" is superior in pinhole properties to the polypropylenes.

(2) As the melt temperature increases the pinhole frequency increases.

Based on these pinhole results it is recommended that for applications requiring low pinholes a melt temperature of below 580° F., for example approximately 535° F., and preferably 520° F. to 570° F. be used. This will reduce the drawdown capability but will still allow coatings of below 10 lb./ream (at 535° F.) at relatively high speeds when utilizing the present invention.

The composition used according to the present invention is also at least as good as the polypropylenes "X" and "Y" as to heat seal temperature, adhesion, and extrudibility (lb./kw.-hr.).

EXAMPLE 4

It has been shown that the product of this invention is at least as good as polypropylene, in all properties, and is superior thereto in pinhole and stress-crack resistance.

When compared to a high density (0.951) polyethylene, the product of the present invention shows superiority in stress-crack and scuff resistance, hardness, heat resistance, and curl. The polypropylene equals the high density polyethylene in water vapor and grease barrier properties.

This example shows additional data on certain properties of coatings of the composition used in this invention as compared to coatings of polypropylene, and coatings of a high density polyethylene, referred to below as "HDPE." These data include grease-proofness (MIL-B-121B), moisture vapor permeability (WVTR), stress, crack, scuff and pinhole resistance, hardness, heat resistance, curl, co-efficient of friction, heat sealability, and seam strength.

Extrusion coatings of the following materials were tested:

| Formula | Flow Rate | Density |
| --- | --- | --- |
| Blend "A" | 66 at 230° C | 0.917 |
| Polypropylene "Y" | 54 at 230° C | 0.916 |
| HDPE | 8 at 190° C | 0.951 |

Procedure and equipment

Coatings of the three materials were applied to 40-pound basis weight kraft paper using the same equipment described above. The polypropylenes were extruded at 560° F. and the one polyethylene at 620° F. Coating weights of about 40, 30, 25, 20, 15, and 10 lb./ream were obtained. Extrusion conditions were as follows:

| | Blend "A" | Polypropylene "Y" | HDPE |
| --- | --- | --- | --- |
| Cyl. Zone 1, ° F | 500 | 500 | 400 |
| Cyl. Zone 2, ° F | 540 | 540 | 505 |
| Cyl. Zone 3, ° F | 570 | 570 | 615 |
| Cyl. Zone 4, ° F | 610 | 615 | 688 |
| Die Zone 1, ° F | 560 | 560 | 620 |
| Die Zone 2, ° F | 560 | 560 | 620 |
| Die Zone 3, ° F | 560 | 560 | 620 |
| Adapter, ° F | 560 | 560 | 620 |
| Die Lips, ° F | 560 | 560 | 620 |
| Melt Temperature, ° F | 561 | 559 | 620 |
| Cyl. Pressure, p.s.i. | 3,100 | 2,950 | 7,000 |
| Chill Roll Temp., ° F | 65 | 64 | 63 |
| Screw Speed, r.p.m | 90 | 90 | 90 |
| Extruder Power, kw | 12.0 | 12.5 | 27.0 |
| Extrusion Rate, lb./hr | 220 | 223 | 244 |
| Line Speed, f.p.m | 160–650 | 160–650 | 160–650 |

Stress crack

Twenty-five pound per ream coatings were heat sealed into 6-inch square flat pouches at temperatures 40° F. above the minimum heat seal temperature. The pouches were then filled with a stress-crack solution of 100% detergent (sold under the trademark "Igepal") and the times to failure noted as follows:

Formula Time to failure (days)
- Blend "A" _____ 6
- Polypropylene "Y" _____ 1
- HDPE _____ 1

Blend "A" exhibits about six times as good a stress-crack resistance as the competitive polypropylene and high density polyethylene.

Pinholes

Figure 3:
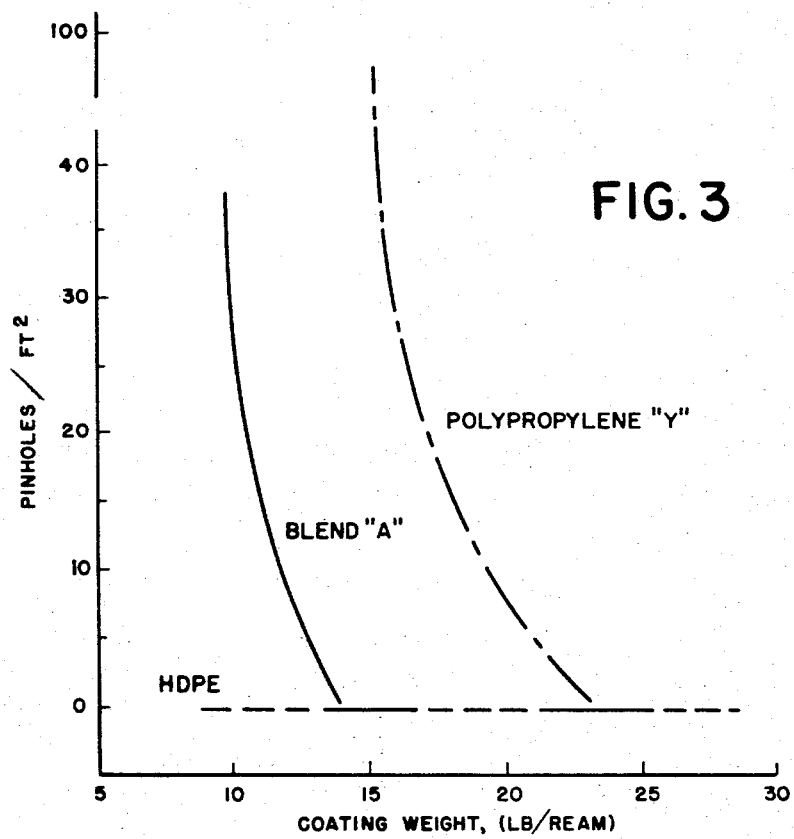

Even though pinholes are a function of extrusion temperature, and the polypropylenes were extruded 60° F. colder than the high density polyethylene, pinholes are nevertheless compared in the graph of FIGURE 3.

The present invention as represented by blend "A" is far superior to the polypropylene in pinhole resistance.

It is just as good as high density polyethylene at coating weights above 1 mil (15 lb./ream).

Curl

The tendency of a coating to shrink and curl can sometimes cause problems in converting equipment. It is apparent that the less curl a coating exhibits, the better it will perform in commercial machines. Coatings of high density polyethylene have a notorious reputation for curl, but this is not the case with polypropylene as will be shown.

Figure 4:
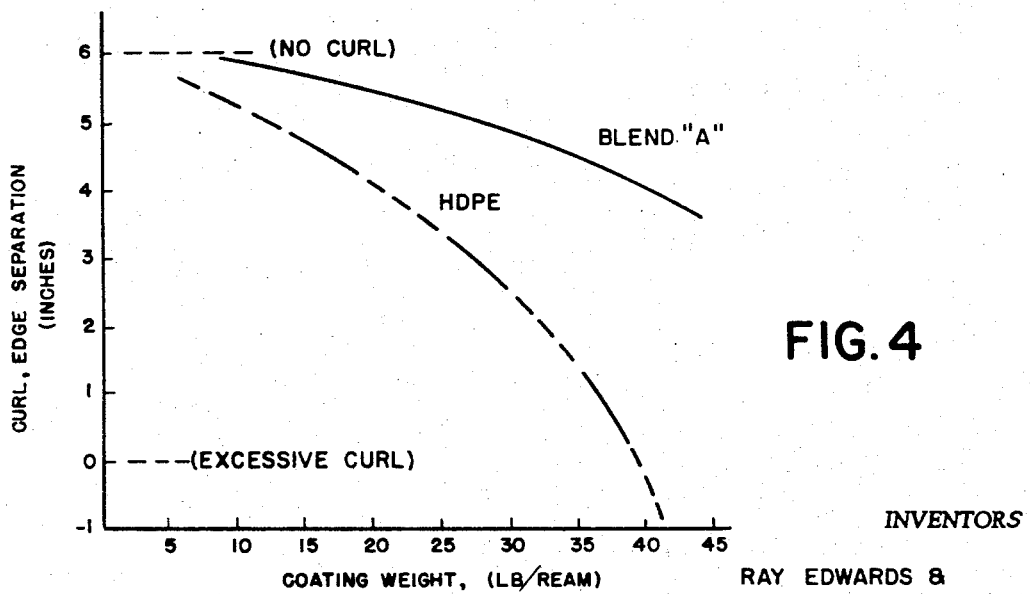

Curl was determined on 6-inch wide (transverse direction) specimens, by measuring the amount of separation of the outside edges after shrinkage was complete. A perfectly flat (no curl) specimen for example would measure 6 inches from edge to edge, and as curl worsened, this distance would decrease until finally the edges would touch (0 inches), then overlap (negative value). Obviously, the nearer the separation is to 6 inches, the better from a standpoint of curl. The graph of FIG. 4 compares the curl according to the present invention to that of high density polyethylene.

Seam strength

One-inch wide strips of 35 lb./ream and 8.5 lb./ream coatings were sealed face-to-face on the Sentinel Heat Sealer at 30 p.s.i. and ½-second at a temperature 40° F. above the minimum required for the particular coating weight. The static force required to separate the heat sealed seams are:

| Coating Weight, Lb./Ream | Seam Strength (g./in.) for Formula Indicated | | |
|---|---|---|---|
| | Blend "A" | Polypropylene "Y" | HDPE |
| 35.0 | 1,100 | 810 | 820 |
| 8.5 | 670 | ----- | 670 |

The composition of this invention thus exhibits another advantage, that of seam strength at heavier coatings.

The film prepared by the present invention as represented by Blend "A" is comparable to or better than polypropylene "Y" and HDPE in water vapor permeability, scuff resistance, hardness, heat resistance, greaseproofness (tested per military specification MIL–B–121B), and coefficient of friction. Heat sealing temperature for the HDPE was somewhat lower than for the other materials.

In utilizing coated cellulosic products such as those of the examples, an outstanding utility is in the manufacture of containers for liquids such as milk or other foods and even for hydrocarbon oils such as high detergent automobile engine oil. A modification is the coating of the polypropylene blend on the inside surfaces of milk (or other food) cartons, overcoated with polyethylene. The polyethylene, melting at a lower temperature than the polypropylene blend beneath it, provides a polyethylene-to-polyethylene seal after heating and clamping. The polypropylene blend coating, melting at a significantly higher temperature than the polyethylene, remains in the solid state, thereby preventing any heated water vapor in the paperboard carton from expanding and penetrating the polyolefin coatings thus creating pinholes and leaks. This pinholing caused by water vapor penetration is a major problem in polyethylene-coated milk cartons. The polypropylene blend coating also improves the barrier properties of the coatings. Another utility is the coating of high speed photographic paper which withstands heats of 135° C. A coating of the blend on substrates such as paper, board, foil, and cellophane gives good environmental stress crack resistance for certain applications including citrus juice cartons, and shampoo containers.

We claim:
1. A process of coating a surface with a thin layer of a polyolefin comprising the steps of applying to said surface a molten composition, the polymeric content of which is at least predominantly a mixture of from about 40% to 99% by weight of polypropylene having a flow rate of from about 12 dg./min. to 120 dg./min. and about 1% to 60% of polyethylene having a melt index of from about 1 dg./min. to 15 dg./min., a density greater than about .912 g./cc., and a melt index recovery of greater than 50%.

2. The process of claim 1 wherein said polyolefin consists essentially of said polyethylene and said polypropylene, said polypropylene has low hexane extractibility and is present in an amount of over about 65% by weight of said mixture, said composition is applied to a cellulosic sheet by continuous extrusion, and the linear coating speed is from about 100 feet per minute to over 2000 feet per minute.

3. The process of claim 2 in which at least about 88% of said polypropylene is insoluble in hexane, said flow rate is at least about 45 dg./min., and said linear coating speed is over about 500 feet per minute.

4. A process comprising shaping at least a part of an article from a polymer the polymeric content of which is at least predominantly a mixture of from about 40% to 99% by weight of polypropylene having a flow rate of from about 12 dg./min. to 120 dg./min. and about 1% to 60% of polyethylene having a melt index of at least about 1 dg./min. a density greater than about .912 g./cc. and a melt index recovery of greater than 50%.

5. The process of claim 4 wherein said shaping is accomplished by extrusion from a melt of the polymer.

6. The process of claim 4 wherein at least about 88% of said polypropylene is insoluble in hexane and is present in an amount of over about 65% by weight of said mixture, and said flow rate is at least 45 dg./min., said shaping is accomplished by extruding a thin film of the polymer from the melt and cooling the film.

7. The process of claim 4 wherein said shaping is accomplished by injection molding said article.

8. A polymer composition which is at least predominantly a mixture of from about 40% to 99% by weight of polypropylene having a flow rate of from about 12 dg./min. to 120 dg./min. and about 1% to 60% of polyethylene having a melt index of from about 1 dg./min. to 15 dg./min., a density greater than about .912 g./cc., and a melt index recovery of greater than 50%.

9. The polymer composition of claim 8 consisting essentially of said polyethylene and said polypropylene, said polypropylene being at least about 88% insoluble in hexane and having a flow rate of at least about 45 dg./min., and said polypropylene being present in an amount of over about 65% by weight.

10. A shaped article of the polymer composition of claim 8.

11. An article comprising a substrate adherently coated with a layer of the polymer composition of claim 8.

12. The article of claim 11 wherein said polymer is fusion-bonded to a sheet of cellulosic fibers.

References Cited

UNITED STATES PATENTS

| 3,125,548 | 3/1964 | Anderson | 260—897 |
| 3,137,672 | 6/1964 | Lehane | 260—897 |
| 3,247,290 | 4/1966 | Werkman et al. | 260—897 |
| 3,256,367 | 6/1966 | Jayne | 260—897 |
| 3,265,771 | 8/1966 | Ray et al. | 260—897 |

FOREIGN PATENTS 641,321    5/1962    Canada.

OTHER REFERENCES

Boenig: Polyolefins, p. 252 (1966).

MURRAY TILLMAN, *Primary Examiner.*

C. J. SECCURO, *Assistant Examiner.*

U.S. Cl. X.R.

117—145, 161; 156—244; 161—249; 264—239